United States Patent [19]

Thompson

[11] Patent Number: 4,466,343
[45] Date of Patent: Aug. 21, 1984

[54] AUTOMATIC ADJUSTING NUTCRACKER

[76] Inventor: Isaac J. Thompson, 2415 NW. Third Ave., Mineral Wells, Tex. 76067

[21] Appl. No.: 436,739

[22] Filed: Oct. 26, 1982

[51] Int. Cl.³ .............................................. A23N 5/00
[52] U.S. Cl. ....................................... 99/572; 99/579; 99/582
[58] Field of Search ..................... 99/568, 571–573, 99/577, 578, 579, 581–583; 30/120.1–120.5; D7/98; 426/481–483

[56] References Cited

U.S. PATENT DOCUMENTS

| | | | |
|---|---|---|---|
| 3,159,194 | 12/1964 | Anderson | D7/98 |
| 3,311,143 | 3/1967 | Vetter | D7/98 |
| 3,477,487 | 11/1969 | Holt | 99/577 |
| 3,841,212 | 10/1974 | Powell | 99/571 |

Primary Examiner—Timothy F. Simone
Attorney, Agent, or Firm—Jerry W. Mills; Jerry R. Selinger; Gregory M. Howison

[57] ABSTRACT

A nutcracker includes a base (12), a stationary jaw (16), a movable jaw (21) and an adjustable post (20). A driving cylinder (36) is urged along the longitudinal axis of the post (20) by a lever (26) connected through a connecting link (30). A spring (42) allows the post (20) to float until a canting pin (46) contacts one end of a ring (22) disposed around the post (20). When the ring (22) cants to contact the post (20), the force applied to the driving cylinder (36) is translated directly to the post (20) to crack a nut disposed between the stationary jaw (16) and the movable jaw (21).

12 Claims, 4 Drawing Figures

4,466,343

AUTOMATIC ADJUSTING NUTCRACKER

TECHNICAL FIELD OF THE INVENTION

The present invention relates in general to nutcrackers and, more particularly, to automatically adjusting nutcrackers that compensate for the size of the nut to be cracked.

BACKGROUND OF THE INVENTION

In order to crack the nutshell and retrieve the meat therefrom, nutcrackers have been developed that allow both a small degree of automatic adjustment for the size of a particular nut and application of the crushing force over only a predetermined distance to prevent shattering of the nutshell into many small fragments. In limiting the travel, application of excessive force is prevented. However, these nutcrackers require a number of maneuvers to place the nut within the jaws and then crack the nutshell itself. For example, in U.S. Pat. No. 3,477,487 issued to S. H. Holt, a nutcracker is disclosed that has a spring-adjusted jaw and a rotational lever on the other jaw. The spring-adjusted jaw provides compensation for the size of the nut and the rotational jaw provides the predetermined cracking force which is provided by advancing the jaw a predetermined distance. To crack the nut, the adjusting jaw must be manually opened and then released on the nut. The rotating lever is then operated to crack the nut. In another example, U.S. Pat. No. 3,159,194 issued to W. A. Anderson, a nutcracker is disclosed that has a series of levers and ratchet-type mechanisms to advance the jaws toward each other. This mechanism also provides a degree of size compensation for the nut itself in addition to the predetermining amount of travel.

The above-discussed nutcrackers illustrate examples of prior art nutcrackers that provide for some degree of size compensation and limited cracking of the nut. However, they are overly complicated and require a number of moving parts. In view of this, it is desirable to provide a nutcracker that automatically compensates for the size of the nut and delivers the cracking force over a predetermined distance with a minimum number of parts.

SUMMARY OF THE INVENTION

The present invention described and disclosed herein comprises an apparatus for automatically cracking a nut. The apparatus includes a stationary jaw, a post movable along a longitudinal axis and a movable jaw fixedly mounted on the post and movable along the longitudinal axis with the post. A lever pivoted on a base provides a force along the longitudinal axis through a connecting link attached to a driving cylinder. A spring is disposed between the driving cylinder and the post to prevent the post for translating the longitudinal force to an object disposed between the movable and stationary jaws. A ring disposed about the post and partially restrained from movement along the longitudinal axis is operable to allow the post to traverse therethrough. A protrusion disposed on the end of the driving cylinder is operable to cant the ring for engagement with the post, thus translating the manual force to the movable jaw after the driving cylinder has traversed a predetermined distance. This predetermined travel delivers the force of the lever to the nut, thereby cracking the nut for retrieval of the meat therefrom. Other aspects of the present invention will become aparent hereianfter.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
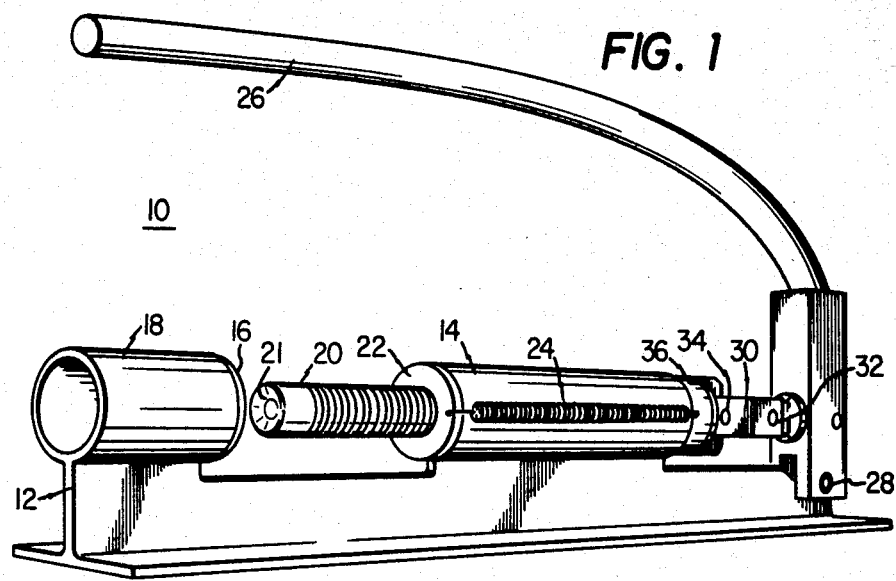
FIG. 1 illustrates a perspective view of the present invention.

Referring now to FIG. 1, there is illustrated a perspective view of the nutcracker 10. The nutcracker 10 has an extruded base 12 which has a cylindrical guide 14 formed thereon. A stationary jaw 16 is mounted on a portion 18 of the extruded base 12.

The portion 18 having the stationary jaw 16 mounted thereon is oriented such that the stationary jaw 16 is perpendicular to the longitudinal axis of the cylindrical guided 14 with the center of the jaw 16 coincident with the longitudinal axis of the guide 14.

A longitudinal post 20 is partially disposed within the cylindrical guide 14 and movable along its longitudinal axis. A movable jaw 21 is disposed on the end of said cracking post 20 proximate said stationary jaw 16. A ring 22 disposed about the cracking post 20 is retained against the cylindrical guide 14 by a spring 24 that is attached at one end to the ring 22 and at the other end to the end of the cylindrical guide 14 opposite the ring 22. A second spring (not shown) is disposed diametrically opposite the ring 22 from the spring 24 for retention of the other side of the ring 22.

An arcuate lever 26 is pivoted about a pivot pin 28 disposed on one end of the base 12. A connecting link 30 is pivoted about a pivot pin 32 on the lever 26 and about a pivot pin 34 on the other end of the connecting link. The pivot pin 34 is disposed through a pivot point on a driving cylinder 36. The driving cylinder traverses through the cylindrical guide 14. The connecting link 30 is operable to translate the rotational force of the lever 26 at the pivot pin 32 to a longitudinal force to drive the driving cylinder 36.

Figure 2:
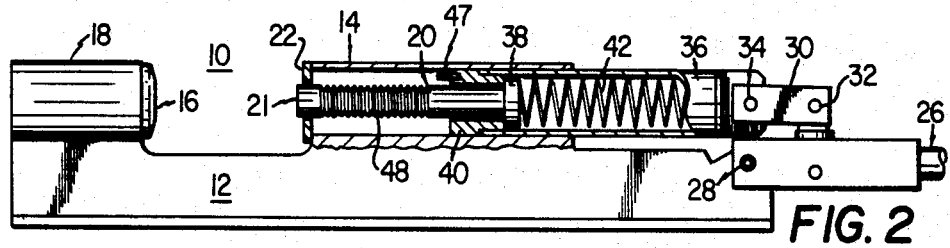
FIG. 2 illustrates a cross-sectional view of the present invention in the fully retracted position.

Referring now to FIG. 2, there is shown a cross-sectional diagram of the nutcracker 10. The driving cylinder 36 is shown in the fully-retracted position which also fully retracts the cracking post 20. The cracking post 20 has a retaining head 38 disposed on the end of the cracking post 20 opposite the movable jaw 21. The retaining head 38 has a diameter larger than that of the cracking post 20. The driving cylinder 36 has a retaining sleeve 40 disposed in the end thereof opposite the end at which the link 30 pivots. The retaining sleeve 40 allows the cracking post 20 to traverse therethrough until the outer periphery of the retaining head 38 abuts the retaining sleeve 40. A spring 42 is disposed within the driving cylinder 36 between the retaining head 38 and the internal end of the driving cylinder 36 that is pivotally attached to the connecting link 30.

When the lever 26 is rotated forward about the pivot pin 28, the driving cylinder 36 moves through the guide 14 along the longitudinal axis of the cracking post 20. The spring 42 is operable to maintain contact between the retaining head 38 and the retaining sleeve 40. This allows the cracking post 20 to "float", that is, move along the longitudinal axis with the driving cylinder 36 until an obstruction is encountered between the stationary jaw 16 and the movable jaw 21. When this obstruction is encountered, the force translated to the obstruction is merely the force applied by the spring 42 since the cracking post 20 freely traverses through the ring 22.

Figure 3:
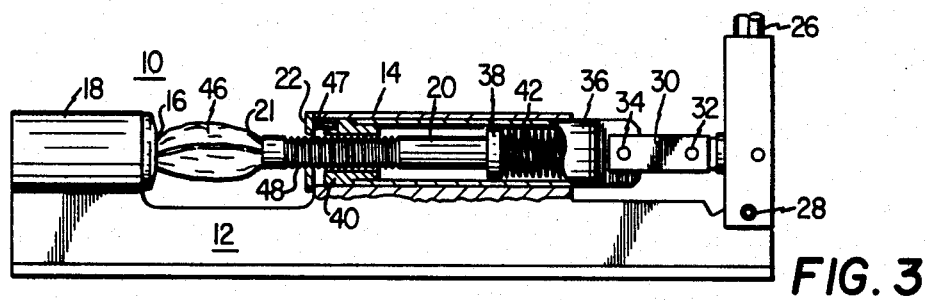
FIG. 3 illustrates a cross-sectional view of the present invention with a nut disposed between the jaws prior to applying a force to the nut.

Referring now to FIG. 3, there is illustrated a cross-sectional diagram of the nutcracker 10 with a nut 46 disposed between the stationary jaw 16 and the movable jaw 21. The lever 26 is shown in an advanced position such that the retaining head 38 of the cracking post 20 is removed from contact with the retaining sleeve 40. In this position, the spring 42 is compressed to allow the lever 26 and the driving cylinder 36 to advance without cracking the nut 46.

The position of the lever 26 in FIG. 3 illustrates the position when a canting pin 47 disposed in the end of the retaining sleeve 40 contacts the ring 22. As long as the ring 22 is restrained against the edge of the cylindrical guide 14 by the spring 24, the cracking post 20 is allowed to freely traverse therethrough and compress the spring 42. This prevents the longitudinal motion of the driving cylinder 36 from being translated to the cracking post 20. As long as the spring 42 undergoes compression, only the spring force will be applied to the nut 46.

Figure 4:
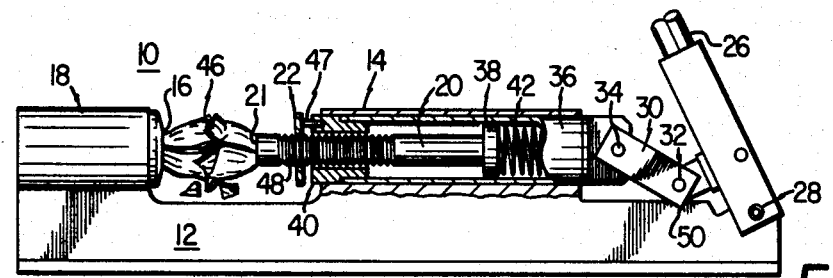
FIG. 4 illustrates the present invention after the cracking force has been applied to the nut.

Referring now to FIG. 4, there is shown a cross-sectional diagram of the nutcracker 10 with the lever 26 fully advanced. In this position, the canting pin 47 advances outward from the cylindrical guide 14 to contact the ring 22 on one side only. This cants the ring 22 to engage it with the cracking post 20. With the ring 22 canted, the longitudinal motion of the driving cylinder 36 is directly translated through the canting pin 47 and the ring 22 to the cracking post 20. A plurality of serrated edges 48 are disposed along the length of the cracking post 20 such that the ring 22 contacts these edges to provide a firmer connection thereon.

The movement of the driving cylinder 36 and the force therewith that is translated to the cracking post 20 provides a sufficient force to crack the nut 46. The distance that the driving cylinder 36 travels between the position shown in FIG. 3 and the position shown in FIG. 4 is finite such that the nut 46 is only subjected to the force for a predetermined travel. This prevents the nut 46 from being shattered into small fragments. It is important in cracking nuts that maximum force be applied on the initial cracking of the nut and once the nut has cracked, to remove the force completely. This is accomplished, as shown in FIG. 3, by dimensioning the apparatus such that the canting pin 47 contacts the ring 22 when the connecting link 30 is parallel to the longitudinal axis of the cracking post 20. In this configuration, the rotational force from the lever 26 at the pivot pin 32 is tangential to the longitudinal axis of the cracking post 20. The arcuate shape of lever 26 allows a downward force to be effectively maximized in the longitudinal direction of the guide 14.

After the nut has been contacted and the force from the lever 46 has been translated to the nut 46, additional motion on the lever 26 cracks the nut 46, as shown in FIG. 4. In addition, the additional travel of the lever 26 causes a downward movement of the pivot pin 32. During this downward movement, a force vector is still translated to the cracking axis of the cracking post 20, but the magnitude of this force diminishes with the rotational travel of the pivot pin 32. With the configuration of the connecting link 30 and the pivot pins 32 and 34, this rotational motion effectively creates a latch. This is because there is a point at which the force vector directed along the longitudinal axis of the cracking post 20 is reduced to zero and then reverses. However, there is a stop 50 which prevents further rotational travel of the pivot 32. Since the force applied to the driving cylinder 36 is effectively zero at this point, the compressive force of the spring 42 dominates. By dimensioning the stop 50 such that the rotational position of the pivot pin 32 surpasses the zero force point, the spring 42 can effectively retain the pivot pin 32 and the connecting link against the stop 50.

In summary, there has been provided an apparatus for cracking nuts that automatically adjusts for the size of the nut and then applies a consistent force for a predetermined distance to crack the nut. The adjustable jaw and the cracking force are all applied along the same longitudinal axis to the same mechanism, thus reducing the adjustments required of an operator. This provides for a one-step nut-cracking procedure.

Although the preferred embodiment has been described in detail, it should be understood that various changes, substitutions and alterations can be made therein without parting from the spirit and scope of the invention as defined by the appended claims.

What I claim is:

1. An apparatus for cracking nuts, comprising:
   a stationary jaw disposed along a longitudinal axis;
   a post movable along said longitudinal axis;
   a movable jaw fixedly mounted on one end of said post and movable along said longitudinal axis with said post toward said stationary jaw to act in conjunction therewith to hold a nut therebetween;
   means for applying a force along said longitudinal axis;
   a spring disposed between said longitudinal force means and said post for yieldably translating said longitudinal force to said post, said spring preventing translation of said longitudinal force to said post when a nut is disposed between said stationary jaw and said moveable jaw; and
   engaging means for engaging said post to directly translate said longitudinal force to said movable jaw to crush an object disposed between said movable jaw and said stationary jaw, said engaging means engaging said post when the nut restricts movement of said moveable jaw such that a cracking force can be delivered to said moveable jaw.

2. The apparatus of claim 1 wherein said means for longitudinally applying a force comprises:
   a base;
   a lever pivoted to said base;
   a translation link pivoted at one end to said lever and disposed a finite distance from said base to translate the rotational motion of said lever;
   a hollow cylindrical member pivoted at one end to the other end of said link; and
   a guide member attached to said base for confirming movement of said cylindrical member along said longitudinal axis;

said post slidably movable within said cylindrical member.

3. The apparatus of claim 2 wherein said engaging means comprises a ring disposed around said post and means for canting said ring on said post when the rotational force delivered to said link from said lever is tangential to said longitudinal axis, said ring directly translating said longitudinal force to said post.

4. The apparatus of claim 3 wherein the force translated to said post is applied for only a predetermined travel of said cylindrical member.

5. The apparatus of claim 3 wherein said means for canting comprises a protuberance extending from the peripheral edge of said cylindrical member and parallel to said longitudinal axis, said protuberance contacting one side of said ring to cant said ring after said cylindrical member has traveled a predetermined distance past the point at which the nut restricts movement of said movable jaw.

6. An apparatus for cracking nuts comprising:
a base;
a cylindrical guide open at both ends and disposed parallel to said base;
a reciprocating cylinder having a hollow core and open at one end only for reciprocation within said cylindrical guide along the longitudinal axis of said cylindrical guide;
means for applying a reciprocating force to said reciprocating cylinder;
a stationary jaw attached to said base and perpendicular to the longitudinal axis of said guide;
a reciprocating post for reciprocation along the longitudinal axis of said guide and disposed partially within the hollow core of said reciprocating cylinder for slideable movement therein;
a movable jaw mounted on the end of said reciprocating post external to said reciprocating cylinder and movable with said post, said movable jaw operable in conjunction with said stationary jaw to hold a nut therebetween;
a translating spring disposed within the hollow core of said reciprocating cylinder between said reciprocating post and the closed end of said reciprocating cylinder to translate reciprocating motion from said reciprocating cylinder to said reciprocating post;
said spring allowing said reciprocating post to yield when the nut is disposed between said movable and stationary jaws;
a ring disposed circumferentially around said reciprocating post adjacent the open end of said cylindrical guide and partically restrained from movement along said longitudinal axis with a restraining spring; and
means for canting said ring to directly translate said reciprocating force from said reciprocating cylinder to said reciprocating post after said reciprocating cylinder has travelled a predetermined distance after the nut has restricted movement of said movable jaw.

7. The apparatus of claim 6 wherein said reciprocating post has a plurality of adjacent circumferential ridges disposed on the surface thereof for coordination with said ring when said ring is canted.

8. The apparatus of claim 6 wherein said reciprocating force means comprises:
a lever pivoted to said base; and
a translation link pivoted at one end to said lever a finite distance from said base and pivoted on the other end to the closed end of said reciprocating cylinder.

9. The apparatus of claim 8 wherein said means for canting is operable to translate the rotational force from said lever to said post when the rotational force of said lever is substantially tangential to the longitudinal axis of said reciprocating cylinder.

10. The apparatus of claim 9 wherein said lever has an arcuate shape such that the end of said lever is substantially parallel to said base when said ring is canted.

11. The apparatus of claim 6 wherein said means for canting comprises a protuberance disposed on the open end of said reciprocating cylinder and protruding along the longitudinal axis of said guide, said protuberance contacting one side of said ring after said reciprocating cylinder has travelled said predetermined distance to cant said ring.

12. An apparatus for cracking nuts comprising:
a base;
a cylindrical guide open at both ends and attached to said base;
a reciprocating cylinder having a hollow core and open at one end only for reciprocating with said guide along the longitudinal axis of said guide, said cylinder having a length shorter than said guide;
a lever pivoted at one end about said base;
a translational link pivoted on one end to said lever a finite distance from said base and pivoted on the other end thereof to the closed end of said reciprocating cylinder, said translational link operable to translate rotational force of said lever to a reciprocating force applied to said reciprocating cylinder along the longitudinal axis thereof;
a reciprocating post having one end partially disposed within said reciprocating cylinder and the other end protruding from the open end of said reciprocating cylinder;
a movable jaw disposed on the end of said reciprocating post diametrically opposite the closed end of said reciprocating cylinder and movable with said post along said longitudinal axis;
a stationary jaw disposed on said base and oriented to coordinate with said movable jaw and hold a nut therebetween when said movable jaw is reciprocated along said longitudinal axis;
a translating spring disposed within the hollow core of said reciprocating cylinder between said reciprocating post and the closed end of said reciprocating cylinder to yieldably translate the reciprocating force from said cylinder to said reciprocating post, said spring allowing said reciprocating post to yield when a nut is encountered between said movable and stationary jaws;
a ring circumferentially disposed around said reciprocating post perpendicular to the longitudinal axis adjacent the open end of said cylindrical guide nearestmost said stationary jaw;
first and second retaining springs having first and second ends, the first ends thereof attached to said guide and the second ends thereof attached to diametrically opposite sides of said ring for partially restraining movement of said ring along the longitudinal axis of said guide; and
a protuberance disposed on the periphery of the open end of said reciprocating cylinder for contacting one side of said ring when said cylinder traverses the entire length of said guide to cant said ring for engagement with said longitudinal post to directly translate the reciprocating force applied to said reciprocating cylinder to said reciprocating post after said reciprocating cylinder has traveled a predetermined distance.

* * * * *